United States Patent
Han et al.

(10) Patent No.: US 11,551,068 B2
(45) Date of Patent: Jan. 10, 2023

(54) PROCESSING SYSTEM AND METHOD FOR BINARY WEIGHT CONVOLUTIONAL NEURAL NETWORK

(71) Applicant: INSTITUTE OF COMPUTING TECHNOLOGY, Beijing (CN)

(72) Inventors: Yinhe Han, Beijing (CN); Haobo Xu, Beijing (CN); Ying Wang, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 586 days.

(21) Appl. No.: 16/603,340

(22) PCT Filed: Feb. 11, 2018

(86) PCT No.: PCT/CN2018/076260
§ 371 (c)(1),
(2) Date: Oct. 7, 2019

(87) PCT Pub. No.: WO2018/205708
PCT Pub. Date: Nov. 15, 2018

(65) Prior Publication Data
US 2021/0089871 A1    Mar. 25, 2021

(30) Foreign Application Priority Data
May 8, 2017    (CN) .......................... 201710315998.8

(51) Int. Cl.
*G06N 3/063*    (2006.01)
*G06F 7/50*    (2006.01)

(52) U.S. Cl.
CPC ............... *G06N 3/063* (2013.01); *G06F 7/50* (2013.01)

(58) Field of Classification Search
CPC ........ G06N 3/063; G06N 3/0454; G06F 7/50; G06F 7/544; G06F 2207/4824
See application file for complete search history.

(56) References Cited

U.S. PATENT DOCUMENTS 10,311,342 B1 *    6/2019    Farhadi ................. G06N 3/084
2014/0344203 A1    11/2014    Ahn
(Continued)

FOREIGN PATENT DOCUMENTS

CN    105260776 A    1/2016
CN    105654176 A    6/2016
(Continued)

OTHER PUBLICATIONS

Andri et al., "YodaNN: An Architecture for Ultra-Low Power Binary-Weight CNN Acceleration", Feb. 24, 2017 (Year: 2017).*
(Continued)

*Primary Examiner* — Aaron W Carter
(74) *Attorney, Agent, or Firm* — Morgan, Lewis & Bockius, LLP

(57) ABSTRACT

The present invention provides a processing system for a binary weight convolutional neural network. The system comprises: at least one storage unit for storing data and instructions; at least one control unit for acquiring the instructions stored in the storage unit and sending out a control signal; and, at least one calculation unit for acquiring, from the storage unit, node values of a layer in a convolutional neural network and corresponding binary weight value data and obtaining node values of a next layer by performing addition and subtraction operations. With the system of the present invention, the data bit width during the calculation process of a convolutional neural network is (Continued)

reduced, the convolutional operation speed is improved, and the storage capacity and operational energy consumption are reduced.

9 Claims, 3 Drawing Sheets

(56) References Cited

U.S. PATENT DOCUMENTS

| | | | | |
|---|---|---|---|---|
| 2018/0032844 | A1* | 2/2018 | Yao | G06V 10/20 |
| 2018/0157966 | A1* | 6/2018 | Henry | G06F 17/153 |
| 2018/0197084 | A1* | 7/2018 | Kim | G06N 3/0454 |
| 2019/0286953 | A1* | 9/2019 | Farhadi | G06V 30/194 |
| 2019/0392299 | A1* | 12/2019 | Ma | G06N 3/0635 |
| 2020/0167654 | A1* | 5/2020 | Guo | G06N 3/0427 |
| 2020/0410318 | A1* | 12/2020 | del Mundo | G06N 3/04 |
| 2021/0089871 | A1* | 3/2021 | Han | G06N 3/063 |
| 2021/0125063 | A1* | 4/2021 | Park | G06N 3/0481 |
| 2021/0192325 | A1* | 6/2021 | Hoang | G11C 13/0069 |

FOREIGN PATENT DOCUMENTS

| | | |
|---|---|---|
| CN | 105681628 A | 6/2016 |
| CN | 106203621 A | 6/2016 |
| CN | 105844330 A | 8/2016 |
| CN | 106127170 A | 11/2016 |
| CN | 107169563 A | 9/2017 |

OTHER PUBLICATIONS

Rastegari et al., "XNOR-Net: ImageNet Classification Using Binary Convolutional Neural Networks"; 2016 (Year: 2016).*
Search Report for Application No. 201710315998.8, dated May 8, 2017, 2 pages.
International Search Report for Application No. PCT/CN2018/076260, dated Apr. 13, 2018, 4 pages.

* cited by examiner

PROCESSING SYSTEM AND METHOD FOR BINARY WEIGHT CONVOLUTIONAL NEURAL NETWORK

RELATED APPLICATIONS

This application is the U.S. national stage application of International (PCT) Patent Application Serial No. PCT/CN2018/076260, filed Feb. 11, 2018, which claims the benefit of Chinese Application No. 201710315998.8, filed May 8, 2017. The entire disclosure of each of these applications is hereby incorporated by reference.

TECHNICAL FIELD

The present invention relates to the technical field of computers, and in particular to a processing system and method for a binary weight convolutional network.

BACKGROUND

The deep learning technology has developed rapidly in recent years. Deep neural networks, especially convolutional neural networks, have been widely applied in fields such as image recognition, voice recognition, natural language understanding, weather prediction, gene expression, content recommendation and intelligent robots. A deep network structure obtained through deep learning is an operational model which contains a large number of data nodes, wherein each data node is connected to other data nodes and the connection relationship among these nodes is represented by a weight. With the increasing complexity of the neural network, in practical applications, the neural network technology causes various problems, such as high resource occupation, slow operational speed and high energy consumption, etc.

In the prior art, in order to solve the above problems, a binary weight convolutional neural network model is applied in such fields as image recognition, augmented reality, virtual reality, etc. The binary weight convolutional neural network reduces the data bit width by binarizing the weights (for example, representing the weight with 1 or −1), thereby greatly reducing the parameter capacity and increasing the operational speed of the network model. The emergence of the binary weight convolutional neural network reduces the hardware configuration required for operating complex systems such as image recognition, and expands the application field of the convolutional neural network.

However, most of the existing applications of the deep learning are realized using a central processing unit, a graphics processing unit or the like. These technologies are low in energy efficiency, and there are serious energy efficiency problems and operational speed bottlenecks when the deep learning is applied in such fields as embedded devices or low-overhead data centers, so that it is difficult to meet the performance requirements of applications. Therefore, it is very difficult to apply the deep learning in small-lightweight devices such as mobile phones and embedded electronic devices.

SUMMARY

In view of the network features and calculation features of a binary weight convolutional neural network, the present invention provides a processing system and method for a binary weight convolutional network to overcome the deficiencies of the prior art described above.

In accordance with one aspect of the present invention, a processing system for a binary weight convolutional neural network is provided. The system includes:

at least one storage unit for storing data and instructions;

at least one control unit for acquiring the instructions stored in the storage unit and sending out a control signal; and at least one calculation unit for acquiring, from the storage unit, node values of a layer in a convolutional neural network and corresponding binary weight value data and obtaining node values of a next layer by performing addition and subtraction operations.

In the system of the present invention, the calculation unit includes a convolution unit and an accumulator, wherein the convolution unit receives node values of a layer in the convolutional neural network and corresponding binary weight value data, and an output of the convolution unit is coupled to the accumulator.

In the system of the present invention, the convolution unit includes a numeral inversion unit, a multiplexer unit and an adder, wherein input data is directed into the multiplexer unit through the numeral inversion unit and directly directed into the multiplexer unit respectively, binary weight value data is directed into the multiplexer unit to control signal gating of the multiplexer unit, and an output of the multiplexer unit is directed into the adder.

In the system of the present invention, the binary weight value is mapped according to the following formula:

$$\text{Binarize}(z) = \begin{cases} 1, & \text{when } z \geq 0 \\ -1, & \text{when } z < 0 \end{cases},$$

where z represents an operand and Binarize(z) represents the mapped value.

In the system of the present invention, the binary weight value is further mapped as:

$$r(z) = \begin{cases} 1, & \text{when } z = 1 \\ 0, & \text{when } z = -1 \end{cases},$$

where z represents an operand and r(z) represents the mapped value.

In accordance with a second aspect of the present invention, a processing method for a binary weight convolutional neural network is provided. The method includes: acquiring node values of a layer in a convolutional neural network and corresponding binary weight value data; and obtaining node values of a next layer by performing addition and subtraction operations.

In the method of the present invention, the binary weight value is mapped according to the following formula:

$$\text{Binarize}(z) = \begin{cases} 1, & \text{when } z \geq 0 \\ -1, & \text{when } z < 0 \end{cases},$$

where z represents an operand and Binarize(z) represents the mapped value.

In the method of the present invention, obtaining node values of a next layer by performing addition and subtraction operations includes: when the weight value is 1, transmitting original input data to an adder; and, when the weight value is −1, transmitting input data obtained after numeral inversion to the adder.

In the method of the present invention, the binary weight value is further mapped as:

$$r(z) = \begin{cases} 1, & \text{when } z = 1 \\ 0, & \text{when } z = -1 \end{cases},$$

where z represents an operand and r(z) represents the mapped value.

Compared with the prior art, the present invention has the following advantages: based on the system of the present invention, a binary convolutional network oriented processor or chip can be realized; and by reducing the bit width of a weight value to a single bit, the overhead of a storage circuit is reduced, and the calculation complexity is reduced. Moreover, the on-chip data transmission bandwidth is also reduced. Compared with a neural network using a common bit width, the processing system provided by the present invention can effectively reduce the power consumption of the chip and the circuit area without losing too much calculation accuracy.

BRIEF DESCRIPTION OF THE DRAWINGS

The following drawings are merely for schematically describing and explaining the present invention, rather than limiting the scope of the present invention, in which.

DETAILED DESCRIPTION OF THE PRESENT INVENTION

To make the objectives, technical solutions, design methods and advantages of the present invention clearer, the present invention will be further described below in detail by specific embodiments with reference to the accompanying drawings. It should be understood that the specific embodiments described herein are merely illustrative of the present invention and are not intended to limit the present invention.

A neural network structure includes an input layer, a plurality of hidden layers and an output layer. In a binary weight convolutional neural network, an input value of a first layer of the multi-layer structure is an original image (the "original image" in the present invention refers to original data to be processed, rather than merely an image obtained by taking photos in a narrow sense). Therefore, during the calculation of the first layer (i.e., an input layer), a normal bit width (e.g., 8 bits, 16 bits, etc.) is required; and the calculation of the remaining layers may be performed in a binary manner, that is, a node of a next layer is obtained by performing a binary operation on the node value of this layer and its corresponding weight value.

Figure 1:
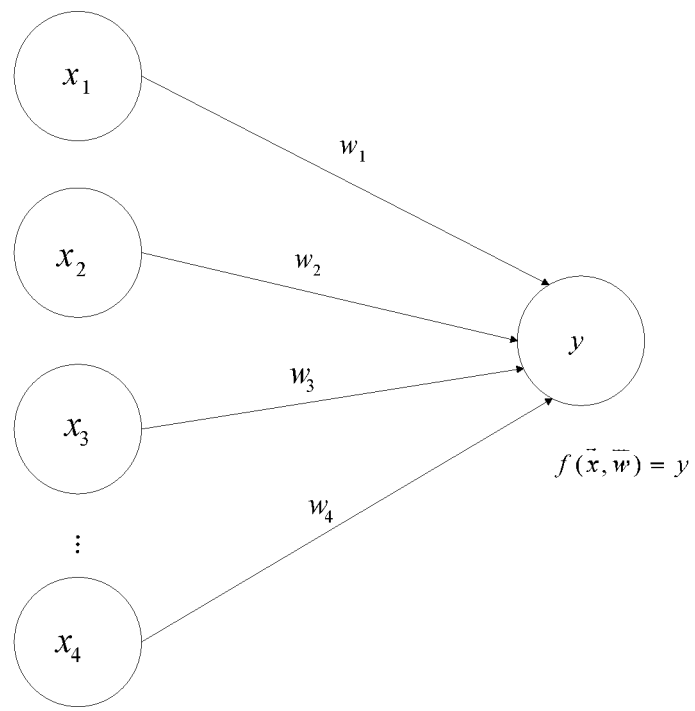
FIG. 1 shows a schematic diagram of a binary neural network model according to an embodiment of the present invention.

Referring to FIG. 1, a schematic diagram of a binary neural network model is shown. It is assumed that $\bar{x}=x_1, x_2, x_3, \ldots, x_n$ represents several nodes in a certain layer in the neural network, and these nodes are connected to a node y in a next layer. $\bar{w}=w_1, w_2, w_3, \ldots, w_n$ represents weights of corresponding connections. Since all weights are binary data, for example, two values of the binary data may be represented by 1 and −1. If the value of y is calculated by a function f, it can be defined that y=x×w. A sa parameter of each layer, the weight value w is the binary data. When the weight value w is 1, the result of calculation of the function f is x; and when the weight value w is −1, the result of calculation of the function f is −x. Therefore, there are lots of multiplication and addition operations during the calculation of each layer.

The present invention is aimed at providing a processing system (or referred to as a processor) oriented to a binary weight neural network. The system replaces the multiplication and addition operations in the conventional convolution neural network with basic addition and subtraction operations during the calculation process of the binary weight neural network, thus improving the operational speed and energy efficiency of the neural network.

Figure 2:
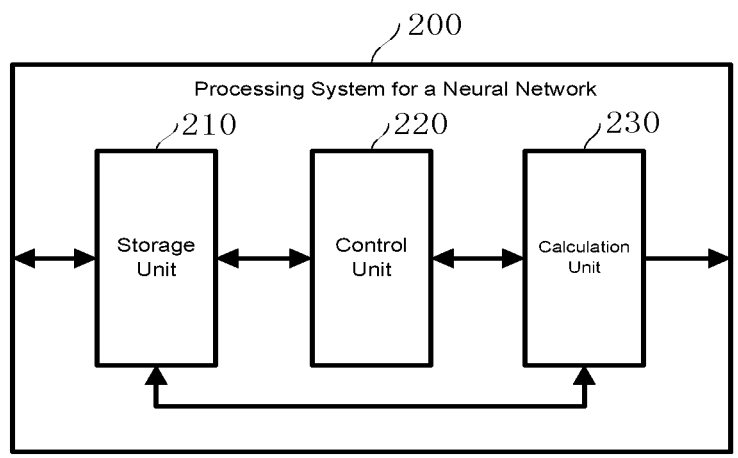
FIG. 2 shows a structural block diagram of a processing system for a neural network according to an embodiment of the present invention.

FIG. 2 shows a block diagram of a processing system for a binary weight neural network according to an embodiment of the present invention. Generally, the neural network processor provided by the present invention is based on a storage-control-calculation structure. The storage structure is configured to store data involved in calculation, neural network weights and processor operation instructions. The control structure is configured to parse the operation instructions and to generate a control signal which is used for controlling the scheduling and storage of data in the processing system and the calculation process of the neural network. The calculation structure is configured to participate in the neural network calculation operations in the processor, so as to ensure that the data and corresponding weights can be correctly calculated in the calculation unit.

Specifically, referring to the embodiment of FIG. 2, a processing system 200 oriented to a binary weight neural network is provided. The processing system 200 includes at least one storage unit 210, at least one control unit 220 and at least one calculation unit 230. The control unit 220 is connected to the storage unit 210 and the calculation unit 230. The calculation unit 230 is connected to the storage unit 210 and configured to read data from or write data into the storage unit 210. The data paths among the storage unit 210, the control unit 220 and the calculation unit 230 involve H-TREE, FAT-TREE or other interconnection technologies.

The storage unit 210 is configured to store data (e.g., original feature map data) transmitted from the outside of the neural network processing system or to store data generated during the processing process, including processing results or intermediate results generated during the processing process. These results may come from a core operational component inside the neural network processing system or other external operational components. Additionally, the storage unit may also be configured to store instruction information (e.g., to load data into the calculation unit, to start the calculation, to terminate the calculation, or to store the result of the calculation into the storage unit, or the like) participating in the calculation. The storage unit may be a common storage media such as a Static Random Access Memory (SRAM), a Dynamic Random Access Memory (DRAM), a register file, etc., or may also be of a novel storage type such as a 3D storage device.

The control unit 220 is configured to acquire and parse an instruction stored in the storage unit, and then control the calculation unit 230 to perform correlation operations of the neural network according to a control signal obtained through parsing. The control unit 220 completes instruction decoding, data scheduling, process control and the like.

The calculation unit 230 is configured to execute corresponding neural network calculation according to the control signal acquired from the control unit 220. The calculation unit 230 is connected to the storage unit 210 to acquire data for calculation and write the result of the calculation into the storage unit 210. The calculation unit 230 can complete most of the calculations in the neural network, for example, a convolution operations, a pooling operation or the like. The pooling operation is generally performed after the convolution operation in order to reduce feature vectors of the convolution layer, and generally includes average pooling and maximum pooling. The method of average pooling is to calculate an average value of all elements in the layer as an output result, and the method of maximum pooling is to calculate a maximum value of all elements in the layer as an output result. The over-fitting of layers can be alleviated by the pooling operation.

It should be understood by those skilled in the art that, although not shown in FIG. 2, the processing system further includes an address addressing function for mapping an input index to a correct storage address to acquire desired data or instructions from the storage unit. The address addressing function may be implemented in the control unit or implemented in the form of a separate unit.

Figure 3:
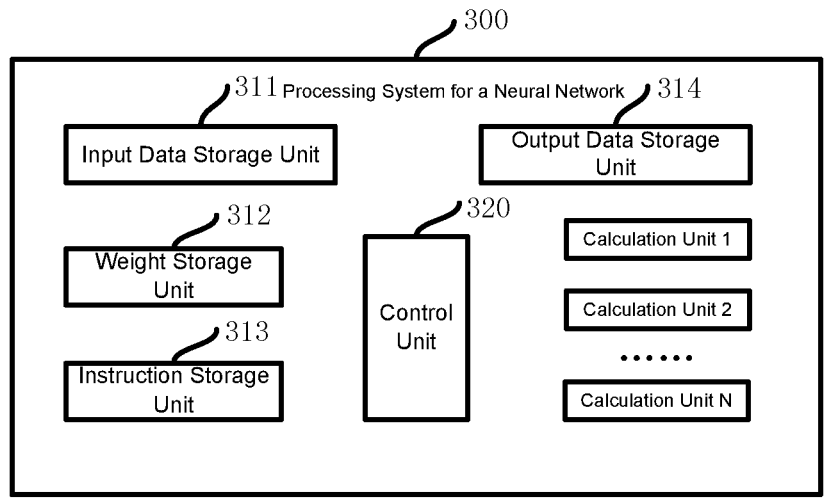
FIG. 3 shows a structural block diagram of a processing system for a neural network according to another embodiment of the present invention.

FIG. 3 is a structural block diagram of a processing system for a neural network according to another embodiment of the present invention. This processing system differs from the processing system for a neural network of FIG. 2 in that: in the processing system 300 for a neural network of FIG. 3 (the connection relationships between units are not shown), according to different types of data to be stored, there are provided a plurality of storage units, i.e., an input data storage unit 311, a weight storage unit 312, an instruction storage unit 313 and an output data storage unit 314. The calculation unit includes a plurality of calculation sub-units 1 to N that can realize parallel processing.

The input data storage unit 311 is configured to store data participating in the calculation. The data includes original feature map data and data participating in the calculation of intermediate layers. The weight storage unit 312 is configured to store trained neural network weights. The instruction storage unit 313 is configured to store instruction information participating in the calculation. The instruction can be parsed into a control stream by the control unit 320 to schedule the calculation of the neural network. The output data storage unit 314 is configured to store the calculated neuron response value. By sub-dividing the storage units, data of substantially the same type can be stored centrally, so that it is convenient to select an appropriate storage medium and the operations such as data addressing can be simplified.

Additionally, the calculation speed of the neural network can be improved by employing a plurality of parallel calculation units.

Figure 4:
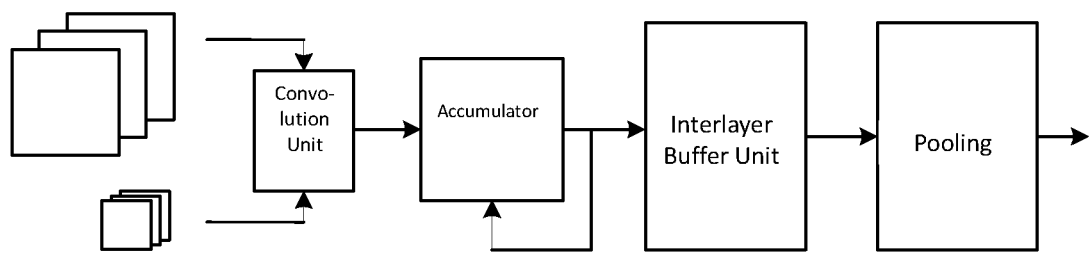
FIG. 4 shows a structural block diagram of a calculation unit in the processing system for a neural network according to the present invention.

FIG. 4 shows a structural block diagram and a connection diagram of the calculation units in FIGS. 2 and 3. As shown in FIG. 4, the calculation unit is composed of a convolution unit, an addition unit (or an adder), an accumulator unit, an interlayer buffer unit, a pooling and batch normalization unit and other operational components, which are connected successively. It is to be noted that, the convolution unit herein means that the result of convolution is performed by addition and subtraction operations during physical implementation.

The convolution unit may be composed of a true form-complement conversion unit, a multiplexer, an adder and other units, and is configured to complete a convolution operation of layer data and weights. The output result is used as input data of the addition unit.

The accumulator is composed of an adder unit and is configured to store and accumulate a part of data and results of the addition unit.

The interlayer buffer unit is composed of a memory and is configured to store the result obtained after the completion of the convolution operation by a single convolution kernel.

The pooling and batch normalization unit performs a pooling operation on the convolution output layer.

In an embodiment of the present invention, the addition unit may be implemented by an OR gate. The input of the OR gate is the output result from the convolution unit, and the output value is a single-bit value. By implementing the addition unit using the OR gate, the operation can be simplified and the operation efficiency can be improved. In another embodiment, the addition unit may be implemented by a Hamming weight calculation unit. The input of the Hamming weight calculation unit is the output result of the convolution unit, and the output value is the number of logic 1s in the input data, i.e., the Hamming weight. By implementing the addition unit using the Hamming weight calculation unit, the summation operation can be realized accurately.

Figure 5:
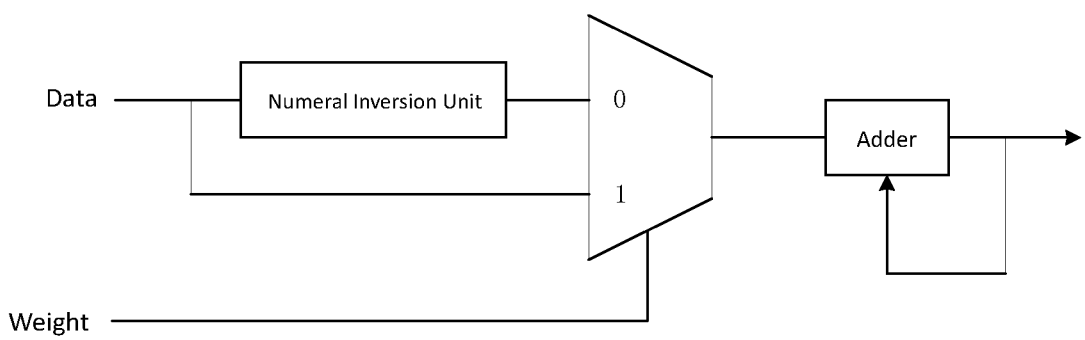
FIG. 5 shows a structural block diagram of a convolution unit in the calculation unit according to the present invention.

Further, the present invention provides a convolution unit for a binary weight neural network, as shown in FIG. 5. The convolution unit is composed of a numeral inversion unit, a multiplexer unit and an adder unit. The input data (e.g., node values of a layer in the convolutional neural network) is directed into the numeral inversion unit and an input of the multiplexer unit, respectively. The numeral inversion unit is connected to another input of the multiplexer unit. The weight data is directed into the multiplexer unit which then serves as a signal gating unit. The output result of the multiplexer unit is directed into the adder unit, and the output result of the adder unit is used as the output result of the convolution unit.

The numeral inversion unit is configured to perform a inversion operation on the input value. In the processing system for a binary weight convolutional neural network provided by the present invention, the positive number is represented by a true form, and the negative number is represented by a complement. The numeral inversion unit may perform numeral inversion on the input data. For example, for a binary positive number 0101(+5) with a sign bit, a binary complement output after inputting the binary positive number into the numeral inversion unit is 1011(−5); and, for a binary negative number 1010(−6) with a sign bit represented by a complement, a binary number output after inputting the binary negative number into the numeral inversion unit is 0110(+6).

In the convolution unit, the original input data and the input data subjected to the numeral inversion are directed into the multiplexer. When the weight value is −1, the multiplexer outputs the input data subjected to the numeral inversion; and, when the weight value is 1, the multiplexer outputs the original input data. The adder unit is configured to complete the addition operation in the convolution operation.

Specifically, when the calculation unit of the present invention is used, by taking $y=x_0 \times w_0 + x_1 \times w_1 + x_2 \times w_2$ in a certain layer of the convolutional neural network as an example, when w0 is 1, w1 is −1 and w2 is 1, then y may be expressed as $y=x_0-x_1+x_2$, that is, the multiplication and addition operation process is converted into addition and subtraction operations.

Additionally, in order to reduce the storage space and improve the operation efficiency, in another embodiment of the present invention, the weight data may be further reduced in the processing system based on a binary weight neural network provided by the present invention. The specific process is as follows.

For the binary weight convolutional neural network, the weights may be represented by 1 and −1. Therefore, when the weight data with a normal bit width in the conventional convolutional neural network is applied in the binary weight convolutional neural network, layers need to be binarized according to the following formula:

$$\text{Binarize}(z) = \begin{cases} 1, & \text{when } z \geq 0 \\ -1, & \text{when } z < 0 \end{cases} \quad (1)$$

where z represents an operand and Binarize(z) represents the mapped result. In other words, the operation expressed by the formula (1) can be interpreted as follows: when the input operand is greater than or equal to zero, the operand is binarized as 1; and, when the operand is smaller than zero, the operand is binarized as −1.

It should be understood by those skilled in the art that, in addition to the determinant binarization adopted in the formula (1), mapping may be performed in other ways. For example, mapping to 1 or −1 is determined by a probability method.

Generally, the binarized weight data in the binary weight neural network may be described by a two-bit binary number, where the high bit is a sign bit and the low bit is a data bit. For example, the binary true form of 1 is 01, and the binary complement of −1 is 11.

The weight data expressed by two bits may be remapped. The remapping function r(z) is:

$$r(z) = \begin{cases} 1, & \text{when } z = 1 \\ 0, & \text{when } z = -1 \end{cases} \quad (2)$$

The operation expressed by the formula (2) can be interpreted as follows: when the input operand is equal to 1, the operand keeps the value of 1 unchanged; and when the operand is −1, the operand is mapped to a value of 0.

Therefore, in the processing system for a binary weight neural network provided by the present invention, it is also possible that the weight value of −1 in the binary weight neural network is represented by a value 0 and the weight value of 1 in the binary weight neural network is represented by a value 1. The weight value loaded into the weight neural network processor needs to be pre-processed off-chip, that is, the weight value is remapped according to the function r(z). In this way, the weight value expressed by two bits can be reduced to a single bit.

Figure 6:
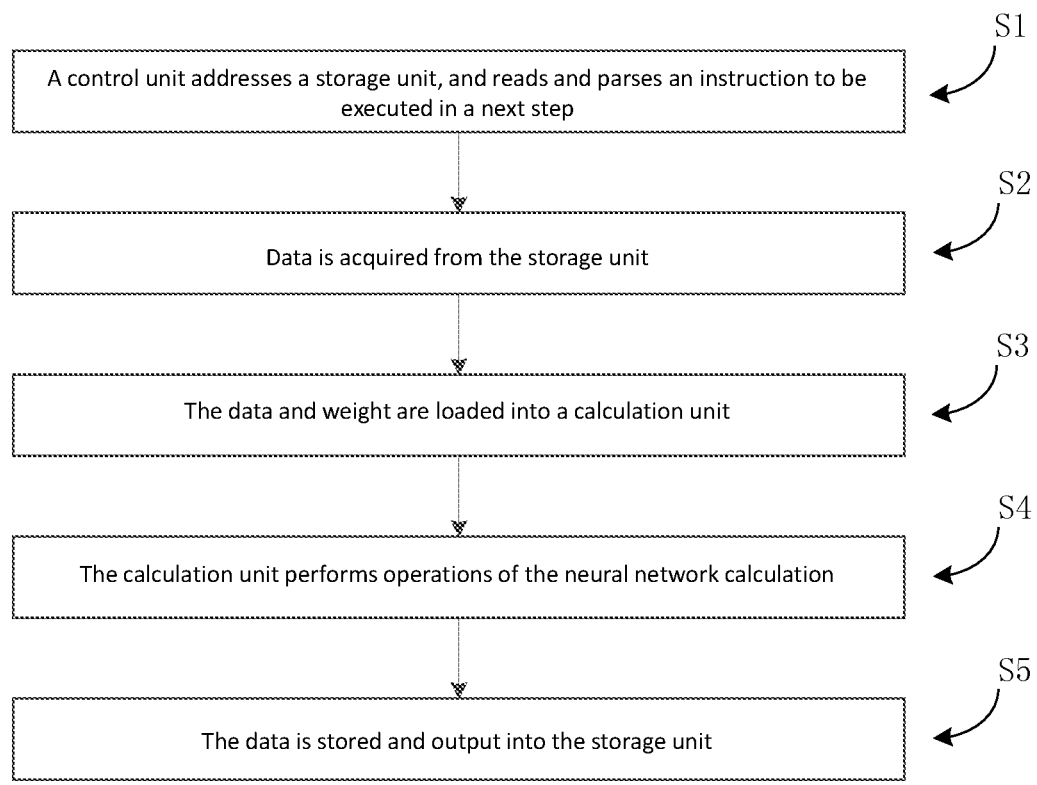
FIG. 6 shows a flowchart of a processing method for a neural network according to an embodiment of the present invention.

FIG. 6 is a flowchart of a method for neural network calculation by the processing system for a neural network of FIG. 3 according to the present invention. The method includes the following steps.

Step S1: A control unit addresses a storage unit, and reads and parses an instruction to be executed in a next step.

Step S2: Input data is acquired from the storage unit according to the storage address obtained by parsing the instruction.

Step S3: The data and weight are loaded into a calculation unit from an input storage unit and a weight storage unit, respectively.

Step S4: The calculation unit performs operations of the neural network calculation, including a convolution operation, a pooling operation and the like.

Step S5: The data is stored and output into the storage unit.

In accordance with the characteristic that the weight values are 1 and −1 in the binary weight neural network, the present invention provides a processing system for a binary weight convolutional neural network. Accordingly, the data bit width during the neural network calculation is reduced, the convolutional operation speed is improved, and the storage capacity and operational energy consumption are reduced.

The convolutional neural network processor of the present invention is applicable to various electronic devices, for example, mobile phones, embedded electronic devices or the like.

The present invention may be a system, method and/or computer program product. The computer program product may include a computer-readable storage medium loaded with computer-readable program instructions for causing a processor to implement various aspects of the present invention.

The computer-readable storage medium may be a tangible device that retains and stores instructions used by an instruction execution device. The computer-readable storage medium may include, for example, but not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a Random Access Memory (RAM), a Read Only Memory (ROM), an Erasable Programmable Read Only Memory (EPROM or flash memory), a Static Random Access Memory (SRAM), a portable Compact Disk Read Only Memory (CD-ROM), a Digital Versatile Disk (DVD), a memory stick, a floppy disk, a mechanical encoding device, a punched card or in-groove bump structure for example stored with instructions, and any suitable combination thereof.

Although various embodiments of the present invention have been described above, the foregoing descriptions are merely exemplary but not exhaustive, and are not limited to the disclosed embodiments. Numerous modifications and alterations will be apparent to a person of ordinary skill in the art without departing from the scope and spirit of the illustrated embodiments. The terms used herein are selected to best explain the principles of the embodiments, practical applications or technical improvements in the market, or to enable those of ordinary skill in the art to understand the various embodiments disclosed herein.

The invention claimed is:

1. A processing system for a binary weight convolutional neural network, characterized in that the system comprises:

at least one storage unit, configured to store data and instructions;

at least one control unit, configured to acquire the instructions stored in the storage unit and send out a control signal; and at least one calculation unit, configured to acquire, from the storage unit, node values of a layer in a convolutional neural network and corresponding binary weight value data and obtain node values of a next layer by performing addition and subtraction operations, wherein the calculation unit comprises a convolution unit, an addition unit, an accumulator unit, an interlayer buffer unit, and a pooling and batch normalization unit, which are connected successively, and wherein the convolution unit is configured to complete convolution operations by performing addition and subtraction operations, the addition unit is configured to receive outputs from the convolution unit and output a single-bit value, the accumulator unit is configured to store and accumulate a part of outputs of the addition unit, and the interlayer buffer unit is configured to store outputs from the accumulator unit.

2. The system according to claim 1, characterized in that the convolution unit comprises a numeral inversion unit, a multiplexer unit and an adder, wherein input data is directed into the multiplexer unit through the numeral inversion unit and directly directed into the multiplexer unit respectively, binary weight value data is directed into the multiplexer unit to control signal gating of the multiplexer unit, and an output of the multiplexer unit is directed into the adder.

3. The system according to claim 1, characterized in that the binary weight value is mapped according to the following formula:

$$\mathrm{Binarize}(z) = \begin{cases} 1, & \text{when } z \geq 0 \\ -1, & \text{when } z < 0 \end{cases},$$

where z represents an operand and Binarize(z) represents the mapped value.

4. The system according to claim 3, characterized in that the binary weight value is further mapped as:

$$r(z) = \begin{cases} 1, & \text{when } z = 1 \\ 0, & \text{when } z = -1 \end{cases},$$

where z represents an operand and r(z) represents the mapped value.

5. A processing method for a binary weight convolutional neural network, characterized in that the processing method comprises:

acquiring, by a calculation unit, node values of a layer in a convolutional neural network and corresponding binary weight value data; and obtaining, by the calculation unit, node values of a next layer by performing addition and subtraction operations, wherein the calculation unit comprises a convolution unit, an addition unit, an accumulator unit, an interlayer buffer unit, and a pooling and batch normalization unit, which are connected successively, and wherein the convolution unit is configured to complete convolution operations by performing addition and subtraction operations, the addition unit is configured to receive outputs from the convolution unit and output a single-bit value, the accumulator unit is configured to store and accumulate a part of outputs of the addition unit, and the interlayer buffer unit is configured to store outputs from the accumulator unit.

6. The processing method according to claim 5, characterized in that the binary weight value is mapped according to the following formula:

$$\mathrm{Binarize}(z) = \begin{cases} 1, & \text{when } z \geq 0 \\ -1, & \text{when } z < 0 \end{cases},$$

where z represents an operand and Binarize(z) represents the mapped value.

7. The processing method according to claim 6, characterized in that obtaining node values of a next layer by performing addition and subtraction operations comprises:

when the weight value is 1, transmitting original input data to an adder; and when the weight value is −1, transmitting input data obtained after numeral inversion to the adder.

8. The processing method according to claim 6, characterized in that the binary weight value is further mapped as:

$$r(z) = \begin{cases} 1, & \text{when } z = 1 \\ 0, & \text{when } z = -1 \end{cases},$$

where z represents an operand and r(z) represents the mapped value.

9. A non-transitory computer-readable storage medium storing computer programs that perform, when executed by a processor, the steps in the method according to claim 5.

* * * * *